(12) United States Patent
Cason et al.

(10) Patent No.: US 7,266,503 B2
(45) Date of Patent: Sep. 4, 2007

(54) SYSTEM AND METHOD FOR GENERATING A COMPANY GROUP USER PROFILE

(75) Inventors: Stanley Philip Cason, Johnson City, NY (US); John Irving Munson, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 09/815,318

(22) Filed: Mar. 22, 2001

(65) Prior Publication Data

US 2002/0138758 A1   Sep. 26, 2002

(51) Int. Cl.
*G06Q 99/00* (2006.01)
(52) U.S. Cl. .................. 705/1; 705/2; 705/3; 705/4; 705/5; 705/6; 705/7; 705/8; 705/9; 705/10; 713/165; 713/166; 713/168; 707/1; 707/2; 707/3; 707/4; 707/5; 707/6; 707/7; 707/8; 707/9; 707/10
(58) Field of Classification Search .............. 705/1–10; 707/1–10; 713/200, 201–202, 166
See application file for complete search history.

(56) References Cited

U.S. PATENT DOCUMENTS

| | | | | |
|---|---|---|---|---|
| 6,094,654 | A * | 7/2000 | Van Huben et al. ............ 707/8 |
| 6,185,545 | B1 * | 2/2001 | Resnick et al. ............... 705/40 |
| 6,418,467 | B1 * | 7/2002 | Schweitzer et al. ......... 709/223 |
| 6,535,294 | B1 * | 3/2003 | Arledge et al. ............ 358/1.15 |
| 6,681,229 | B1 * | 1/2004 | Cason et al. ................ 707/101 |
| 6,704,612 | B1 * | 3/2004 | Hahn-Carlson ............. 700/213 |
| 6,772,167 | B1 * | 8/2004 | Snavely et al. ............. 707/102 |
| 6,785,822 | B1 * | 8/2004 | Sadhwani-Tully .......... 713/201 |
| 6,834,294 | B1 * | 12/2004 | Katz .......................... 709/203 |
| 6,839,680 | B1 * | 1/2005 | Liu et al. ....................... 705/10 |
| 6,853,630 | B1 * | 2/2005 | Manning ................... 370/338 |
| 2002/0055878 | A1 * | 5/2002 | Burton et al. ................ 705/26 |
| 2002/0138281 | A1 * | 9/2002 | Cirulli et al. .................. 705/1 |
| 2002/0161606 | A1 * | 10/2002 | Bennett et al. ................ 705/2 |
| 2002/0184125 | A1 * | 12/2002 | Cirulli et al. ................ 705/35 |
| 2003/0074580 | A1 * | 4/2003 | Knouse et al. ............. 713/201 |
| 2003/0187688 | A1 * | 10/2003 | Fey et al. ...................... 705/2 |

\* cited by examiner

*Primary Examiner*—Lan-Dai Truong
(74) *Attorney, Agent, or Firm*—William E. Schiesser; Shelley M Beckstrand

(57) ABSTRACT

An enterprise provides procurement services to a plurality of companies organized in company groups, each company group including those companies using the same accounting rules. These services are accessed by customer company employees, or users. The creation and maintenance of user profile for each user authorized by a customer company is accomplished according company groupings. Company name is passed to the enterprise in a human resource file or interface, to which a company grouping code is added. That data is loaded into employee staging tables from which an application builds a user profile table which, for new users, does not include company code and location code. These codes will be populated to the profile the first time the user logs in for service and selects from a drop down list describing all work locations for his company group a line item including a description of his work location.

7 Claims, 1 Drawing Sheet

SYSTEM AND METHOD FOR GENERATING A COMPANY GROUP USER PROFILE

BACKGROUND OF THE INVENTION

Cross References to Related Applications

The following U.S. Pat. applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing", Ser. No. 09/657,216, filed 7 Sep. 2000, entitled "System and Method for Front End Business Logic and Validation", Ser. No. 09/657,217, filed 7 Sep. 2000, entitled "System and Method for Data Transfer With Respect to External Applications", Ser. No. 09/656,037, filed 7 Sep. 2000, now U.S. Pat. No. 6,681,229 B1 by Stanly P. Cason and Ira H. Cohen, issued 20 Jan. 2004, entitled "System and Method for Providing a Relational Database Backend", Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files"; and Ser. No. 09/657,195, filed 7 Sep. 2000, entitled "System and Method for Providing an Application Navigator Client Menu Side Bar".

Ser. No. 09/815,462, filed 28 Mar. 2001, entitled "SYSTEM AND METHOD FOR AUTOMATING INVOICE PROCESSING WITH POSITIVE CONFIRMATION".

Ser. No. 09/819,437, filed 28 Mar. 2001, now U.S. Pat. No. 6,686,932, issued 3 Feb. 2004, entitled "SYSTEM AND METHOD FOR SHARING DATA ACROSS FRAMES USING ENVIRONMENT VARIABLES".

Ser. No. 09/815,317, filed 22 Mar. 2001, entitled "SYSTEM AND METHOD FOR SYNCHRONIZING LEDGER ACCOUNTS BY COMPANY GROUP".

Ser. No. 09/815,320, filed 22 Mar. 2001, entitled "SYSTEM AND METHOD FOR GROUPING COMPANIES ACCORDING TO ACCOUNTING SYSTEM OR RULES".

Ser. No. 09/815,316, filed 22 Mar. 2001, entitled "SYSTEM AND METHOD FOR FRAME STORAGE OF EXECUTABLE CODE".

Ser. No. 09/815,313, filed 22 Mar. 2001, entitled "SYSTEM AND METHOD FOR INVOICE IMAGING THROUGH NEGATIVE CONFIRMATION PROCESS".

Ser. No. 09/815,312, filed 22 Mar. 2001, entitled "SYSTEM AND METHOD FOR LEVERAGING PROCUREMENT ACROSS COMPANIES AND COMPANY GROUPS".

Ser. No. 09/816,264, filed 23 Mar. 2001, entitled "SYSTEM AND METHOD FOR PROCESSING TAX CODES BY COMPANY GROUP".

Ser. No. 09/798,598, filed 2 Mar. 2001, entitled "SYSTEM AND METHOD FOR MANAGING INTERNET TRADING NETWORKS".

The above-identified patent applications are incorporated herein by reference.

TECHNICAL FIELD OF THE INVENTION

This invention pertains to a procurement and accounting system. More particularly, it relates to a system for preparing user profiles for customer company employees authorized to access an enterprise procurement and requisition system.

BACKGROUND ART

A requisition and catalog (RCW) system for access via the web and deployed to customers of an enterprise requires visibility to all of the authorized users. The RCW system requires for each authorized user his name, employee number, address (default ship to address for procured goods and services), and E-mail address. Previously, this information was gathered from various sources, a complex and time consuming process.

The enterprise procurement services system, such as the SAP system, and RCW system further require for each such user a company code and a plant code. SAP is a procurement engine used by the an enterprise to satisfy the procurement requirements of a customer company. These codes are configuration entities in SAP, and unknown to the authorized users. There is required a system and method for collecting authorized user identification data and corresponding codes before the user can be permitted to log on to the RCW system to submit a purchase requisition.

A most difficult problem facing such an enterprise is helping customer companies provide such data about its employees. The system and method provided for doing so must be easy for a user requester to use, isolating him from technicalities of SAP or other such back end engines.

Further, such a system must make provision for updating the user profile if an employee transfers to a new company within a company group, or to a new plant location.

It is an object of the invention to provide an improved system and method for creating user profiles.

It is a further object of the invention to provide a system and method for creating user profiles which is easy to use by a prospective requisition requester.

It is a further object of the invention to provide a system and method for authorizing access to a requisition and catalog system by an employee of a company within a company group for which an enterprise provides procurement services.

It is a further object of the invention to provide an improved system and method for reconfiguring a user profile when that user changes company location.

SUMMARY OF THE INVENTION

A system and method for creating a user profile for a user authorized by a customer company to access services provided by an enterprise, the method including the steps of preparing for each new user a profile entry including a user identifier and company group identifier; responsive to access by an authorized user, obtaining a corresponding profile entry; responsive to the profile entry not including company code and location indicia, displaying to user descriptions of locations for the company group; and responsive to user selection of a location description, populating to the profile entry the corresponding company code and location code.

In accordance with an aspect of the invention, there is provided a computer program product configured to be operable to creating a user profile for a user authorized by a customer company to access services provided by an enterprise.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
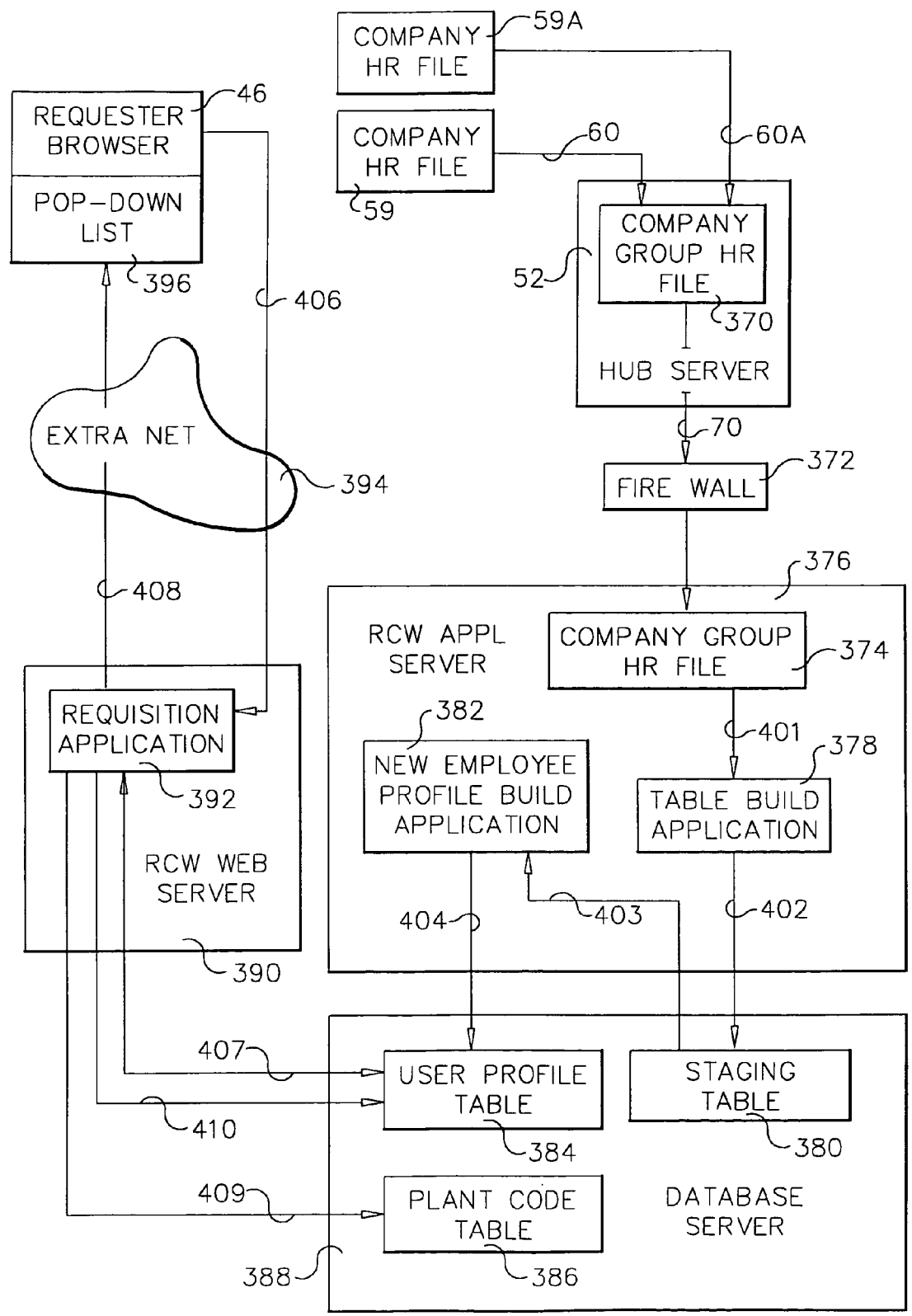
FIG. 1 is a diagram illustrating the user profile creation and maintenance system and method of the preferred embodiment of the invention.

In accordance with the preferred embodiment of the invention, an enterprise provides procurement services to a plurality of customer companies organized in company groups, each company group including one or more related companies which use the same accounting codes and procedures.

Referring to FIG. 1, a plurality of related companies 59, 59A are connected to a hub server which includes a company group human resources file. Hub server is connected through fire wall 372 to a requisition and catalog (ReqCatWeb, or RCW) application server 376. RCW server 374 includes a company group HR file, a staging table build application 378 and a new employee profile build application 382. Applications 402, 404 are logically connected to database server 388, which includes staging table 380, user profile table 384, and plant code table 386.

Connected to an RCW web server 390 deployed to customer companies through extra net 394 is a browser operable by a user for accessing a catalog (not shown) maintained by the enterprise, and for submitting to the enterprise requisitions for purchase of commodities and services against the accounts of a customer company. In exemplary embodiment, extra net 394 may be a secure network, such as a frame relay network connection, or a secure protocol on the world wide web.

To support procurement services for a plurality of users from different companies, the enterprise RCW system requires visibility to all of the users, and requires for each user his name, employee number, address (default ship to address for procured goods and services), E-mail address, and a SAP company code and plant code, which are configuration entities in SAP.

In operation, by way of overview, the creation and maintenance of the user profile is accomplished according company groupings: these are titles of corporations, and each grouping may have many company codes (a company grouping is a legal entity with its own requirements). Company name is passed in a human resource file or interface, to which a company grouping code is added. That data is loaded into employee staging tables of RCW. The process then looks for new employees, builds an employee profile which includes company code and group code Originally blank, then filled out using tables of grouping, company code, plant code, description). A pop down menu advises a new person to select a location, and from that the employee profile is built.

In step 60, on a periodic basis, customer companies provides an HR file containing a list of all employees that are authorized to use RCW with a company grouping ID in a company code field. Hub server 52 merges these HR files 59, 59A into a company group HR file 370 which, in step 70, it transmits through fire wall 372 to application server 376 where it is stored in company group HR file 374.

In step 401, staging table build application reads file 374 and in step 402 moves it to staging table 380 in database server 388. At this point, company group HR file 374 includes an entry for each person authorized by companies within a company group, and that entry includes the information available from the customer companies but not other information, such as company code and location code, required by servers 390, 376 and the SAP system and unavailable from the company HR files 59, 59A.

In step 403, new employee profile build application reads from staging table 380 the authorized users and in step 404 adds to user profile table 384 an entry for each new user. At this point, user profile table includes an entry for all authorized users for a company grouping, but critical information (company code and location code) is missing for newly authorized (or changed) users.

Responsive to a request received at web server 390 from requester browser 46 to enter a transaction on behalf of a user, such as accessing a catalog and submitting a requisition for a commodity or service, in step 407 requisition application 392 accesses user profile table 384 to obtain the user's profile. It determines if the user profile for the user has SAP company code and plant code entries, and if not, executes a new user procedure to complete the preparation of the user profile.

In step 409, for a new user, application 392 accesses plant code table 386. Plant code table 386 includes a table including a plurality of entries, each entry including company group code, company code, and location code fields and a description which is meaningful to prospective users. Each company group code may apply to a plurality of company codes, and each company code to a plurality of location codes. From plant code table 386, requisition application 392 populates in step 408 at browser 46 a pop-down list 396 which includes each combination of company code, location code and description for the user's company group. (The user's company group is input from browser 46 when the user logs on to web server 390.)

The user selects from the pop-down list 396 the location at which he works, which in step 406 is sent back to application 392. In step 410, application 392 populates the user profile entry in user profile table 384 for this user with the company code and location code corresponding to the description at pop-down list 396 selected by the user. This completes the user profile entry for this user, who no longer is a new user and may now proceed to access the financial services provided by the enterprise for the company group of which he is an authorized user.

If an employee transfers, that is nicely handled by making the person look like a new employee when, in steps 60 and 70 his profile data is submitted to application server 376, which will trigger the above process for updating the entry for the user in user profile table 384.

Advantages Over the Prior Art

It is an advantage of the invention that there is provided an improved system and method for creating user profiles.

It is a further advantage of the invention that there is provided a system and method for creating user profiles which is easy to use by a prospective requisition requester.

It is a further advantage of the invention that there is provided a system and method for authorizing access to a requisition and catalog system by an employee of a company within a company group for which an enterprise provides procurement services.

It is a further advantage of the invention that there is provided an improved system and method for reconfiguring a user profile when that user changes company location.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for creating and maintaining at an enterprise server a user profile table with a user profile entry for each of a plurality of users identified by a customer company within a company group of related companies for accessing services provided by an enterprise, access to said services by said user requiring a company code and a location code known to said enterprise and not known to a company group and its constituent customer companies, each company group of a plurality of distinct company groups including one or more related customer companies which use same accounting codes, with accounting codes that vary between company groups, comprising the steps of:
   providing to said company group a company group identifier;
   maintaining at said enterprise server a plant code table of entries including for each company group identifier, corresponding company codes, location codes and descriptions;
   periodically receiving at said enterprise server from a company group a file of user entries, said file of user entries including for each of a plurality of users from one or more constituent customer companies a user identifier and a corresponding company group identifier, but not said company code and said location code;
   storing said file of user entries to a staging table at said enterprise server;
   identifying in said staging table a new user entry, and for each new user entry building in said user profile table an initial profile entry including said user identifier and said company group identifier;
   responsive to access to said enterprise server by a prospective user providing a first user identifier and a first company group identifier, obtaining from said user profile table a first profile entry for said prospective user; responsive to said first profile entry not including company code and location code, with said first company group identifier accessing said plant code table and displaying to said user descriptions of locations for customer companies within said company group; and
   responsive to user selection of a displayed location description, populating to said first profile entry for said prospective user said company code and said location code from said plant code table.

2. A method for creating and maintaining at an enterprise server for each of a plurality of users identified by customer companies within a company group of related companies a user profile for identifying a user requesting to access services provided by an enterprise, access to said services by said user requiring a company code and a location code known to said enterprise and not known to a company group and its constituent customer companies, each company group of a plurality of distinct company groups including one or more related customer companies which use same accounting codes, with accounting codes that vary between company groups, comprising the steps of
   receiving from said enterprise server at a hub server of a company group a company group indicia;
   each said company group providing to said enterprise server for each constituent customer company its company name and work location descriptions;
   maintaining at said enterprise server a plant code table of entries of company codes and location codes for each of said company groups and their respective constituent customer companies;
   on a periodic basis, receiving at a hub server of said company group from each said constituent customer company within a company group a file containing a list of employees identified by said constituent companies to use said services;
   said hub server merging said files into a staging table of users identified by a customer company to access services provided by said enterprise and transmitting said staging table to said enterprise server, said staging table including for each entry a user identifier and said company group indicia, but not said company code and said location code;
   said enterprise server, with reference to said staging table, building and storing to user profile table a user profile entry for each new user, said user profile entry for a user initially including said company group indicia but not including said company code and said location code;
   responsive to a request including a first company group indicia from a requester to access said services, reading said user profile entry for said requester;
   responsive to said profile entry for said requester not including said company code and said location code, displaying from said plant code table to said requester descriptions of work locations corresponding to first company group indicia; and
   responsive to user selection of work location description, populating to said profile entry for said requester corresponding location code and company code.

3. The method of claim 2, further comprising the steps of:
   building a plant code table including for each company code and location code combination associated with a company group a requester intelligible location description; and
   displaying said requester intelligible location descriptions associated with said company group in a selection list to said requester when said company code and said location code are not included in said user profile for said requester.

4. The method of claim 3, said transmitting step occurring through a firewall, and said displaying step occurring through a secure frame relay network.

5. System for creating at an enterprise server a user profile for each of a plurality of users identified by a customer company within a company group of related customer companies to access services provided by an enterprises access to said services by a user requiring a company code and a work location code known to said enterprise and not known to a company group and its constituent customer companies, comprising:
- a company group code assigned at said enterprise system to each said customer company within said company group;
- a plant code table maintained at said enterprise system, said plant code table comprising entries of company codes and work location codes for each of a plurality of companies within said company groups;
- a staging table at said enterprise system for receiving from a company group hub server a file of entries for said users, each said entry including a user identifier and said company group identifier, but not said company code and said location code;
- a profile table at said enterprise server derived from said staging table including for each user a profile entry initially including a user identifier and a company group identifier and not including enterprise selected company code and location code;
- enterprise server application code responsive to a request by a first user for access to said services whose profile entry does not include a company code and location code for displaying a selection list of descriptions of work locations from which to determine company and location codes necessary to process said request;
- said application code being further responsive to user selection of a description of a work location for populating to said profile entry said company and location codes.

6. The system of claim 5, said plant code table including for each combination of company code and location code associated with a company group a corresponding said description of accounting indicia.

7. A program storage device readable by a machine, tangibly embodying a program of instructions executable by a machine to perform method steps for creating a user profile for a plurality of users identified by a customer company to access services provided by an enterprise, a collection of related customer companies forming a company group, access to said services by a user requiring a company code and a work location code known to said enterprise and not known to a company group and its constituent customer companies, said method steps comprising:
- a machine readable storage device;
- first program instructions for providing to said company group a company group identifier;
- second program instructions for maintaining at said enterprise server a plant code table of entries including for each company group identifier, corresponding company codes, location codes and descriptions;
- third program instructions for receiving on a periodic basis, from each said company group for its constituent customer a file containing a list of all new employees identified by a customer company to use said services;
- fourth program instructions for storing said files into a staging table;
- fifth program instructions for identifying new users in said staging table and for building in a profile table an initial user profile entry for each new user, said initial user profile entry including company group indicia but not including company code and location code;
- sixth program instructions responsive to a request including first user identifier and first company group identifier from a first requester to access said services for reading from said profile table a first profile entry for said requester;
- responsive to said first profile entry not including said company code and location code, displaying to said requester descriptions of work locations for said first company group identifier assessing said plant code table; and
- responsive to user selection of a work location description, populating to said first profile entry corresponding company code and location code.

* * * * *